United States Patent Office 3,654,333
Patented Apr. 4, 1972

3,654,333
3,4,4-TRIFLUORO-3-BUTENYLTHIO METHYL-IDENE COMPOUNDS AND THEIR UTILITY
Mervin E. Brokke, Richmond, and Thomas B. Williamson, Santa Clara, Calif., and George E. Lukes, deceased, late of El Cerrito, Calif., by Wayne C. Jaeschke, special administrator, Walnut Creek, Calif., assignors to Stauffer Chemical Company, New York, N.Y.
No Drawing. Application May 27, 1968, Ser. No. 735,495, now Patent No. 3,510,503, dated May 5, 1970, which is a continuation-in-part of application Ser. No. 491,508, Sept. 27, 1965. Divided and this application Dec. 18, 1969, Ser. No. 888,114
Int. Cl. C07c *119/00*
U.S. Cl. 260—453 R      6 Claims

ABSTRACT OF THE DISCLOSURE

Compounds of the formula $$CF_2=CFCH_2CH_2S\overset{\overset{X}{\|}}{C}-R$$

wherein X is a member selected from the group consisting of oxygen, sulfur, imino, phenylimino, chlorophenylimino, alkylimino containing from 1 to 8 carbon atoms, inclusive, and alkenylimino containing 2 to 4 carbon atoms, inclusive, R is selected from the group

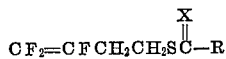

wherein $R^1$ and $R^2$, individually, are selected from the group consisting of hydrogen, alkyl containing from 1 to 10 carbon atoms, inclusive, hydroxyalkyl containing from 1 to 4 carbon atoms, inclusive, alkenyl containing from 2 to 4 carbon atoms, inclusive, cycloalkyl containing from 4 to 6 carbon atoms, inclusive, phenyl, and $R^1$ and $R^2$ jointly are a divalent alkylene radical containing 4 to 6 carbon atoms, inclusive, and $R^3$ is selected from the group lower alkyl, chlorophenyl lower alkyl, and 3,4,4-trifluoro-3-butenyl. The above compounds are effective herbicides and nematocides.

This application is a division of copending application Ser. No. 735,495, filed May 27, 1968, now U.S. Pat. 3,510,503, which application is a continuation in part of copending application Ser. No. 491,508, filed Sept. 27, 1965, now abandoned.

This invention relates to certain new substituted 3,4,4-trifluoro-3-butenylthio methylidene compounds and to the utility of said compounds as nematocides and herbicides. More specifically, this invention relates to compounds of the general formula $$CF_2=CFCH_2CH_2-S\overset{\overset{X}{\|}}{C}-R$$

wherein X is a member selected from the group consisting of oxygen, sulfur, imino, phenylimino, chlorophenylimino, alkylimino containing from 1 to 8 carbon atoms, inclusive, and alkenylimino containing 2 to 4 carbon atoms, inclusive; R is selected from the group

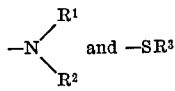

wherein $R^1$ and $R^2$, individually, are selected from the group consisting of hydrogen, alkyl containing from 1 to 10 carbon atoms, inclusive, hydroxyalkyl containing from 1 to 4 carbon atoms, inclusive, alkenyl containing from 2 to 4 carbon atoms, inclusive, cycloalkyl containing from 4 to 6 carbon atoms, inclusive, phenyl, and $R^1$ and $R^2$ jointly are a divalent alkylene radical containing 4 to 6 carbon atoms, inclusive, and $R^3$ is selected from the group lower alkyl, chlorophenyl lower alkyl, and 3,4,4-trifluoro-3-butenyl.

In the above description, the following preferred embodiments are intended for the various groups: in alkylimino such alkyl members as containing from 1 to about 8 carbon atoms in both straight chain and branched chain configurations, for example, methyl, ethyl, propyl, butyl, amyl, hexyl, octyl, isooctyl and 2,2-dimethylbutyl; in alkenylimino, such alkenyl members as containing from 2 to about 4 carbon atoms, inclusive, for example vinyl, allyl, butenyl and the like. The term alkyl preferably includes those members of the group which contain 1 to about 10 carbon atoms, inclusive, in both straight chain and branched chain configurations. Preferable embodiments of the term alkyl as used herein are, for example, methyl, ethyl, propyl, butyl pentyl, hexyl, heptyl, octyl, nonyl, decyl, neopentyl, isopentyl, sec-butyl, isobutyl, tert-butyl, 1-methylpentyl, 1,1-dimethylpentyl, 1,2-dimethylpropyl, 1,1,2,2-tetramethyl propyl, 1,1-dimethyl butyl, 1,1-dimethyl pentyl, 1,1-trimethyl butyl, 1-ethylbutyl and 1-ethylpentyl. The term hydroxyalkyl, preferably includes those members of the group which contain from 1 to about 4 carbon atoms, inclusive, for example hydroxymethyl, hydroxyethyl, hydroxypropyl, hydroxybutyl. The term cycloalkyl preferably includes those members of the group which contain from about 4 to about 6 carbon atoms, inclusive, for example, cyclobutyl, cyclopentyl and cyclohexyl. The term lower alkyl preferably includes members of the group in which the lower alkyl group contains from 1 to about 6 carbon atoms inclusive, in both straight chain and branched chain configurations, for example, methyl, ethyl, propyl, butyl, pentyl, hexyl, isopropyl, isobutyl, tert-butyl, 1-methylpentyl, 1,2-dimethylpropyl, neopentyl and isopentyl. The term chlorophenyl lower alkyl preferably includes those members of the group which contain 1 to about 2 carbon atoms in the lower alkyl group, for example, chlorophenylmethyl and chlorophenylethyl. The phrase $R^1$ and $R^2$ jointly are a divalent alkylene radical containing 4 to 6 carbon atoms preferably includes such groups as tetramethylene, pentamethylene and hexamethylene.

The compounds herein disclosed are prepared by various methods. One such general method applied in preparing the compounds was the condensation of the appropriate mercaptan and carbon disulfide in the presence of basic catalyst followed by the addition of 1,1,2-trifluoro-4-bromobutene-1. Similarly, some of the compounds may be prepared by the condensation of a substituted amine, carbon disulfide and 1,1,2-trifluoro-4-bromobutene-1. In the same manner, a substituted thiourea may be condensed with 1,1,2-trifluoro-4-bromobutene-1, and likewise a secondary amine, carbon oxysulfide and 1,1,2-trifluoro-4-bromobutene-1 may be reacted to produce N,N-disubstituted-S-trifluorobutenyl thiocarbamates. The reactions proceed readily in the liquid phase and which are between room temperature and reflux temperature of the solvent, if any is used, are employed. Preferably, the reaction mixture is refluxed, usually at an elevated temperature.

It has been found that the compounds of the present invention are particularly effective as nematocides and herbicides. They are effective in the control of nematodes which applied to a nematodal habitat.

The method of the present invention of controlling undesirable vegetation comprises applying an herbicidally effective amount of the above-described compounds to the area where control is desired. An herbicide is used herein to mean a compound which controls or modifies the growth of plants. By an "herbicidally effective amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation including the roots and above-ground portions.

The compounds of the present invention may be prepared in accordance with the following illustrative examples.

EXAMPLE 1

Preparation of S,S-bis-(3,4,4-trifluoro-3-butenyl) N-ethylimino dithiocarbonate

Ethylamine (9.0 g.) and triethylamine (40.4 g.) were placed in a flask and 15.2 g. of carbon disulfide was added dropwise. The flask and its contents during the addition were kept at a temperature of 10–20° C. and then stirred for 30 minutes at 25° C. 1,1,2-trifluoro-4-bromobutene-1 was added and the reaction mixture heated at 60° C. for 1:2 hours.

Recovery of the product was accomplished by pouring the reaction mixture into water and extracting with benzene. The benzene was washed with water and dried with anhydrous calcium chloride. The benzene solution was filtered and the solvent removed. There was obtained 51.8 g. (77%) of the title compound, a yellow liquid, B.P. 87° C./0.1 mm., $n_D^{30}$ 1.5249.

*Analysis.*—Calculated for $C_{11}H_{13}F_6NS_2$ (percent): Carbon, 45.5; hydrogen, 4.7. Found (percent): Carbon, 45.0; hydrogen, 5.20.

EXAMPLE 2

Preparation of 3,4,4-trifluoro-3-butenyl ethyl trithiocarbonate

In the same manner as Example 1, ethyl mercaptan (6.2 g.) and triethylamine (10.1 g.) were dissolved in 150 ml. of dioxane. Carbon disulfide (7.6 g.) was then added to the mixture at a temperature held between 20–30° C. The reaction mixture was heated to 40–45° C. for 45 minutes, 1,1,2-trifluoro-4-bromobutene-1 (18.9 g.) was added and the mixture was stirred and heated to 60° C. for about an hour. It was then poured into water and the product recovered in benzene, as described in Example 1. There was obtained 8.5 g. of the product, B.P. 69–70° C./0.1 mm.

*Analysis.*—Calculated for $C_7H_9F_3S_3$ (percent): Carbon, 34.0; hydrogen, 3.7. Found (percent): Carbon, 34.7; hydrogen, 4.0.

EXAMPLE 3

Preparation of S-(3,4,4-trifluoro-3-butenyl) N-phenyl-N-methyl isothiourea 1-methyl-1-phenyl thiourea (16.6 g.) and 1,1,2-trifluoro-4-bromobutene-1 (18.9 g.) were heated under reflux for three hours in 100 ml. of nitromethane as solvent. The solvent was removed under reduced pressure. The residue was taken up in water and neutralized with cold potassium hydroxide. The product was extracted with benzene, dried over anhydrous calcium chloride and the solvent removed by evaporation. There was obtained 19.7 g. of the title compound, $n_D^{30}$ 1.5339.

*Analysis.*—Calculated for $C_{12}H_{13}F_3N_2S$ (percent): Carbon, 53.0; hydrogen, 4.8; nitrogen, 10.2. Found (percent): Carbon, 53.4; hydrogen, 5.2; nitrogen, 10.1.

The following is a table of the compounds prepared according to the aforedescribed procedures. Compound numbers have been assigned to each compound and are then used for identification throughout the balance of the application.

TABLE I $$CF_2\!=\!CFCH_2CH_2\!-\!S\overset{\overset{\displaystyle X}{\|}}{C}\!-\!R$$

| Compound number | X | R | $n_D^{30}$ or (M.P.,° C.) |
|---|---|---|---|
| 1 | S | —NHCH₃ | 1.5247 |
| 2 | S | —N(CH₃)₂ | 1.5280 |
| 3 | S | —NHCH₂—CH=CH₂ | 1.5329 |
| 4 | NCH₃ | —SCH₂CH₂CF=CF₂ | 1.5121 |
| 5 | S | —SCH₂CH₂CF=CF₂ | 1.4859 |
| 6 | S | —N(H)CH(CH₃)₂ | 1.5103 |
| 7 | S | —N(H)C₂H₅ | 1.5075 |
| 8 | S | —N(H)C₄H₉ | 1.5158 |
| 9 | S | —NH(CH₂)₇CH₃ | 1.4974 |
| 10 | S | —N(C₂H₅)₂ | 1.5149 |
| 11 | S | —N(cyclohexyl)₂ | 1.5075 |
| 12 | S | —N(CH₂CH=CH₂)₂ | 1.5365 |
| 13 [1] | NC₂H₅ | —SCH₂CH₂CF=CF₂ | 1.5249 |
| 14 | N(CH₂)₃CH₃ | —SCH₂CH₂CF=CF₂ | 1.5172 |
| 15 | NCH₂CH=CH₂ | —SCH₂CH₂CF=CF₂ | 1.5315 |
| 16 | N(CH₂)₇CH₃ | —SCH₂CH₂CF=CF₂ | 1.4983 |
| 17 [2] | S | —SC₂H₅ | 1.5544 |
| 18 | S | —S-n-C₄H₉ | 1.5270 |
| 19 | S | —SCH₂-p-Cl-phenyl | 1.6135 |
| 20 | N-n-C₄H₉ | —N(H)-n-C₄H₉ | 1.5270 |
| 21 [3] | NH | —N(CH₃)-phenyl | 1.5339 |
| 22 | N-phenyl | —N(H)CH₃ | (137–138) |
| 23 | N-p-Cl-phenyl | —N(H)CH₃ | (4) |
| 24 | O | —N(n-C₄H₉)₂ | 1.4569 |
| 25 | O | —N(i-C₃H₇)₂ | 1.4550 |
| 26 | O | —N(n-C₃H₇)₂ | 1.4540 |
| 27 | O | —N(CH₂CH=CH₂)₂ | (5) |
| 28 | O | —N=(CH₂)₆ | (5) |
| 29 | O | —N(C₂H₅)-n-C₄H₉ | 1.4538 |
| 30 | O | —N[CH₂(CH₂)₃CH₃]₂ | 1.4544 |
| 31 | O | —N(C₂H₅)CH₂CH₂OH | 1.4692 |
| 32 | O | —N(C₂H₅)₂ | 1.4518 |
| 33 | O | —N(H)CH(CH₃)₂ | (48–51) |
| 34 | O | —N(H)CH₂CH(CH₃)₂ | 1.4547 |

[1] Prepared in Example 1.
[2] Prepared in Example 2.
[3] Prepared in Example 3.
[4] Oil.
[5] Liquid.

Other examples of compounds falling within the generic formula presented herein and which may be formulated into herbicidal and nematocidal compositions and applied as herein illustrated are:

3′,4′,4′-trifluoro-3′-butenyl-3-p-chlorophenylethyl trithiocarbonate

3′,4′,4′-trifluoro-3′-butenyl-3-p-chlorophenyl ethyl dithiocarbonate

N-ethyl-N-α-hydroxymethyl-S-(3,4,4-trifluorobutenyl-3) thiolcarbamate

N-n-butyl-N-γ-hydroxy propyl-S-(3,4,4-trifluorobutenyl-3) dithiocarbamate

N-alkyl-N-δ-hydroxybutyl-S-(3,4,4-trifluorobutenyl-3) dithiocarbamate

S-(3,4,4-trifluorobutenyl-3)-1-tetramethyleneimine carbothiolate

S′-(3,4,4-trifluorobutenyl-3)-1-pentamethyleneimine carbothiolate

S-(3′,4′,4′-trifluorobutenyl-3′)-N,N-dicyclobutyl dithiocarbamate

S-(3′,4′,4′-trifluorobutenyl-3′)-N,N-dicyclopentyl dithiocarbamate

S-(3′,4′,4′-trifluorobutenyl-3)-N,N-dicyclobutyl thiolcarbamate.

As previously pointed out, the herein described toxicants produced in the above-described manner are biologically active entities which are useful and valuable in the control of various organisms. The compounds of the invention were tested as nematocides in the following manner.

Nematocide evaluation test.—This test determines a candidates action on root-knot nematodes (Meloidogyne, sp.) in soil. One-pound portions of soil infested with root-knot nematodes were placed in quart jars. The chemical to be tested was pipetted into the nematode infested soil at various dilutions of from 100 to 1 part per million (p.p.m.) or until activity was lost. After mixing the candidate compound into the soil, the soil was sealed for 48 hours. The treated soil was then placed in paper containers and allowed to stand in a greenhouse one week for airing.

At the end of this time, a tomato plant was transplanted into the soil. The root-knot nematodes attack the tomato plant roots if they survive the chemical treatment, and cause swelling or knots on the roots. Four weeks after treatment, the plant was removed from the soil and the roots inspected. The lowest concentration which prevented nematode development was recorded. The results are set forth in the following table:

TABLE II

| Compound number | Nematode control, p.p.m. | Compound number | Nematode control, p.p.m. |
|---|---|---|---|
| 1 | 50 | 17 | (1) |
| 2 | (1) | 18 | 2.5 |
| 3 | 2.5 | 19 | 50 |
| 4 | 25 | 20 | 50 |
| 5 | (5) | 21 | 25 |
| 6 | (5) | 22 | 10 |
| 7 | (10) | 23 | 10 |
| 8 | (10) | 28 | 25 |
| 9 | (10) | 29 | 10 |
| 10 | 10 | 30 | 10 |
| 11 | 50 | 31 | 100 |
| 12 | (25) | 32 | (25) |
| 13 | (5) | 33 | 5 |
| 14 | (10) | 34 | (10) |
| 15 | (5) | 35 | (5) |
| 16 | 10 | | |

NOTE.—Parentheses indicate partial control.

The compounds of the present invention may be used as effective nematocides and may be applied in a variety of ways at various concentrations. In practice, the compounds are usually formulated with an inert nematocidal adjuvant, utilizing methods well known to those skilled in the art, thereby making them suitable for application as dusts, sprays or drenches. The amount applied will depend upon the nature of the nematode to be controlled and the rate of application may vary from 1 to 50 pounds per acre. One particularly advantageous way of applying the nematocidal composition comprising the adjuvant and an effective amount of a compound of the present invention is as a spray, drench or dust followed by incorporation.

Herbicidal screening tests

As previously mentioned, the herein described compounds produced in the above-described manner are phytotoxic compounds which are useful and valuable in controlling various plant species. Compounds of this invention are tested as herbicides in the following manner.

Pre-emergence herbicide test.—On the day preceding treatment, seeds of seven different plant species are planted in individual rows using one species per row across the width of the flat. The seeds used are hairy crabgrass (*Digitaria sanguinalis* (L.) Scop.), Annual bluegrass (*Poa annua* (L.)), watergrass (*Echinochloa crusgalli* (L.) Beauv.), California red oat (*Avena sativa* (L.)) redroot pigweed (*Amaranthus retroflexus* (L.), Indian mustard (*Brassica juncea* (L.) Coss.) and curly dock (*Rumex crispus* (L.). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxyethylene sorbitan monolaurate). The following day, each flat is sprayed at the rate of 20 pounds of the candidate compound per 80 gallons of solution per acre. An atomizer is used to spray the solution on soil surface. The flats are placed in a greenhouse at 80° F. and watered regularly. Two weeks later, the degree of weed control is determined by comparing the amount of germination and growth of each weed in the treated flats with weeds in several untreated control flats. The rating system is as follows:

—=no significant injury (0–15 percent control)
+=slight injury (25–35 percent control)
++=moderate injury (55–65 percent control)
+++=severe injury or death (85–100 percent control)

An activity index is used to represent the total activity on all seven weed species. It is the sum of the number of plus marks, so that an activity index of 21 represents complete control of all seven weeds. The results of this test are reported in Table II.

Post-emergence herbicide test.—Seeds of six plant species including hairy crabgrass, watergrass, California red oats, Indian mustard, curly dock and pinto beans (*Phaseolus vulgaris*), are planted in flats as described above for pre-emergence screening. The flats are placed in the greenhouse at 72–85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxy-ethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taken care not to wet the foliage.

Injury rates are recorded 14 days after treatment. The rating system is the same as described above for the pre-emergence test where (—), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table III.

TABLE III.—HERBICIDAL ACTIVITY SCREENING RESULTS

| | Herbicidal activity index [1] | |
|---|---|---|
| | Pre-emergence (20 lb./a.) | Post-emergence (12.5 lb./a.) |
| Compound number: | | |
| 1 [2] | 9 | 2 |
| 2 [2] | 3 | 3 |
| 3 [2] | 1 | 6 |
| 4 [2] | 2 | 3 |
| 5 | 12 | 6 |
| 7 | 1 | 6 |
| 8 | 3 | 15 |
| 9 | 3 | 5 |
| 10 | 6 | 3 |
| 12 | 2 | 4 |
| 13 | 0 | 11 |
| 14 | 0 | 6 |
| 15 | 0 | 9 |
| 16 | 0 | 3 |
| 17 | 3 | 4 |
| 18 | 0 | 3 |
| 19 | 0 | 8 |
| 20 | 0 | 8 |
| 21 | 0 | 3 |
| 22 | 0 | 5 |
| 23 | 18 | 16 |
| 24 | 13 | 7 |
| 25 | 14 | 8 |
| 26 | 12 | 11 |
| 27 | 14 | 2 |
| 28 | 16 | 8 |
| 29 | 12 | 12 |
| 30 | 9 | 2 |
| 31 | 4 | 8 |
| 32 | 11 | 9 |
| 33 | 1 | 4 |
| 34 | 8 | 5 |

[1] 21=85–100% control of all 7 weed species tested preemergence, 18=85–100% control of all 6 weed species tested postemergence.
[2] Green foxtail (*Setaria vividis* (L.) Beauv.) was substituted for Annual bluegrass (*Poa annua* (L.)).

Compound Number 25, the N,N-di-isopropyl amino analog of the oxygen containing members is of particular utility in controlling wild oats (*Avena fatua* (L.)) in wheat and barley crops. When this compound is incorporated into the soil preplant, no injury was observed in the crops while control of the weed specie was effected. The present invention further relates to a selective herbicidal composition useful for the control of wild oats in wheat and barley crops which comprises S-(3,4,4-trifluoro-3-butenyl)N,N-di-isopropylthiolcarbamate and an inert herbicidal adjuvant.

The compounds of the present invention are used as pre-emergence or post-emergence herbicides and are applied in a variety of ways at various concentrations. In practice, the compounds are formulated with an inert carrier, utilizing methods well known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include for example, 2,4 - dichlorophenoxyacetic acids, 2,4,5 - trichlorophenoxyacetic acid, 2 - methyl - 4 - chlorophenoxyacetic acid and the salts, esters and amides thereof; triazine derivatives, such as 2,4 - bis(3 - methoxypropylamino) - 6 - methylthio - S-triazine; 2 - chloro - 4 - ethylamino - 6 - isopropylamino-S - triazine, and 2 - ethylamino - 4 - isopropylamino - 6-methylmercapto - S - triazine, urea and 3 - (p - chlorophenyl) - 1,1 - dimethyl urea and acetamides such as N,N - diallyl - α - chloroacetamide, N - (α - chloroacetyl) hexamethylene imine, and N,N-diethyl-a-bromoacetamide, and the like; benzoic acids such as 3-amino-2,5-dichlorobenzoic and; thiocarbamates, such as S-propyl dipropylthiocarbamate; S-ethyl-dipropylthiocarbamate, S-ethyl - cyclohexyl - ethyl - thiocarbamate, S-ethyl hexahydro - $1H$ - azepine - 1 - carbothioate and the like. Fertilizers useful in combination with the active ingredients include for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed is readily determinable by those skilled in the art. Various changes and modifications are possible without departing from the spirit apparent to those skilled in the art to which it pertains. It is accordingly intended that the present invention shall only be limited by the scope of the claims.

What is claimed is:

1. Compounds of the formula

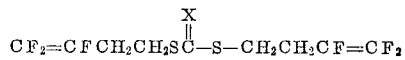

wherein X is a member selected from the group consisting of alkylimino containing from 1 to 8 carbon atoms, inclusive, and alkenylimino containing 2 to 4 carbon atoms, inclusive.

2. A compound according to claim 1 in which X is N-ethylimino.

3. A compound according to claim 1 in which X is N-allylimino.

4. A compound according to claim 1 in which X is N-methylimino.

5. A compound according to claim 1 in which X is N-n-butylimino.

6. A compound according to claim 1 in which X is N-n-octylimino.

References Cited

UNITED STATES PATENTS

| | | | |
|---|---|---|---|
| 3,335,182 | 8/1967 | Curtis et al. | 71—101 |
| 3,161,498 | 12/1964 | Price et al. | 260—566 |
| 2,396,513 | 3/1946 | Jones | 71—98 |

FOREIGN PATENTS

| | | | |
|---|---|---|---|
| 619,282 | 3/1961 | Italy | 71—100 |

LEWIS GOTTS, Primary Examiner

G. HOLLRAH, Assistant Examiner

U.S. Cl. X.R.

71—72, 76, 77, 88, 98, 99, Dig. 1; 424—298, 322